United States Patent [19]

Kaylor

[11] Patent Number: 5,422,330
[45] Date of Patent: Jun. 6, 1995

[54] SORBENT COMPOSITIONS, USES, AND METHODS OF MANUFACTURE

[75] Inventor: Joseph B. Kaylor, Manassas, Va.

[73] Assignee: Valkyrie Scientific Proprietary, L.C, Reston, Va.

[21] Appl. No.: 4,538

[22] Filed: Jan. 14, 1993

Related U.S. Application Data

[63] Continuation-in-part of Ser. No. 871,070, Apr. 20, 1992, Pat. No. 5,332,524.

[51] Int. Cl.⁶ ................... B01J 20/26; B01J 20/22; B01J 20/20
[52] U.S. Cl. .................. 502/402; 502/404; 502/416; 252/184; 252/190; 252/363.5; 252/601; 252/602; 252/4; 252/5; 524/916; 524/917
[58] Field of Search .............. 252/363.5, 3, 4, 5, 252/6, 184, 190, 192, 193, 194; 524/916; 526/932; 502/402, 404, 417

[56] References Cited

U.S. PATENT DOCUMENTS

| | | | |
|---|---|---|---|
| 3,828,470 | 8/1974 | Stoller | 47/1.4 |
| 4,537,877 | 8/1985 | Ericsson | 502/402 |
| 4,770,715 | 9/1988 | Mandel et al. | 134/40 |
| 4,770,761 | 9/1988 | Mandel et al. | 134/40 |
| 4,865,761 | 9/1989 | Mandel et al. | 252/190 |
| 4,913,835 | 4/1990 | Mandel et al. | 252/190 |
| 5,062,996 | 11/1991 | Kaylor | 252/610 |
| 5,188,064 | 2/1993 | House | 119/172 |
| 5,207,830 | 5/1993 | Cowan et al. | 106/672 |

OTHER PUBLICATIONS

Ansul Corp., Marinette, Wis., *Spill-X-S Solvent Absrobent Data Sheet*, No. SC-8647-5, (1989).

*Primary Examiner*—Gary Geist
*Assistant Examiner*—Joseph D. Anthony
*Attorney, Agent, or Firm*—Roland H. Shubert

[57] ABSTRACT

A dry, particulate sorbent composition containing an organic absorbent, a combustible adsorbent, a water swellable polymer and a water soluble polymer is used to soak up and contain flammable liquids and to render the resulting product fire-safe by misting the product surface with water. Water contacting the polymers contained in the sorbent composition forms with those polymers a surface film which is resistant to the passage of combustible gases thus rendering the sorbed mass fire-safe even when briefly exposed to an open flame.

23 Claims, No Drawings

SORBENT COMPOSITIONS, USES, AND METHODS OF MANUFACTURE

This application is a continuation-in-part of U.S. patent application Ser. No. 07/871,070, which was filed on Apr. 20, 1992, now U.S. Pat. No. 5,332,524.

TECHNICAL FIELD

This invention relates to sorbent compositions for soaking up and containing spilled flammable liquids while substantially reducing their fire hazard and release of vapors into the work environment.

Specific embodiments of this invention include sorbent compositions which soak up, immobilize, and make fire-safe flammable hydrocarbon liquids such as gasoline; other sorbent-containing compositions which clean hydrocarbon-contaminated surfaces such as concrete floors; and methods for manufacturing those compositions.

BACKGROUND ART

Spills of fuels, oils, hydraulic fluids, solvents and other flammable liquids are common in the course of equipment maintenance procedures, refueling operations, and accidents involving vehicle collisions or roll overs. A great variety of absorbent materials have been used to soak up such spilled flammable liquids. Both organic and inorganic absorbents have been commonly used for that purpose. Useful organic absorbents include sawdust, wood pulp, paper, peanut hulls, ground corn cobs, shredded peat moss and other cellulosic materials. Commonly used inorganic absorbents include clays pumice, expanded micas, diatomaceous earth, fullers earth and many more. U.S. Pat. No. 4,537,877, to Ericsson, presents a comprehensive description of organic and inorganic solid absorbents and sets out the advantages and disadvantages of the various materials.

Adsorbent solids have also been used to treat spills of many common hydrocarbon solvents and fuels. One such adsorbent is sold under the trademark SPILL-X and is described in U.S. Pat. No. 4,770,715. The adsorbent composition comprises activated carbon either alone or compounded with clays, low molecular weight hydrophobic polymers, alumina, silica, magnesium silicate, and similar materials. An application technique taught in the patent is to apply the absorbent in layers; a first layer to absorb the spill followed by one or more other layers which serve to elevate the flashpoint of the absorbed liquid.

It is also known to use a mixture of sawdust and particulate rubber, typically a high molecular weight polyisobutylene, to absorb hydrocarbon liquids. The rubber particles tend to dissolve in the hydrocarbon liquid as it soaks into the sawdust particles to form an adhesive which binds the liquid-loaded sawdust particles together. In practice, it has been found that the adhesive properties of the liquid-loaded composition tends to cause it to adhere to surfaces such as concrete floors thus complicating the clean-up effort.

Applicant, in his prior U.S. Pat. No. 5,062,996, described methods and compositions for sorbing flammable liquids to render the resulting product fire resistant. Those compositions necessarily included three components. A first necessary component comprised an absorbent solid or mixture of absorbent solids, those absorbents preferably being inorganic and non-combustible. A second necessary component comprised a polymer, such as a rubber, which is soluble in the liquid being sorbed, and of a high enough molecular weight to impart a substantial degree of viscoelasticity to the liquid. The last necessary component comprised one or more dry chemical fire extinguishing agents such as, for example, sodium bicarbonate and monoammonium phosphate.

DISCLOSURE OF THE INVENTION

This invention provides improved sorbent compositions for soaking up flammable liquids and rendering the product fire-safe. Also provided are processes for making the compositions and for using the compositions to clean oils, greases and the like from surfaces and machinery. The sorbent compositions include an absorbent, an adsorbent and at least one hydrophilic polymer in intimate, particulate association. For the purposes of this disclosure, the terms "absorbent" and "adsorbent" are used in their traditional sense. That is, an absorbent is defined as a solid which takes up a liquid by absorption while an adsorbent is a solid which takes up a liquid by adsorption. Absorption is distinguished from adsorption in that the latter is a surface phenomenon, i.e., the liquid taken up is distributed over the surface of the adsorbing material. In absorption the liquid taken up is distributed throughout the body of the absorbent. Preferred sorbent compositions comprise an organic absorbent formulated with a minor amount of a particulate adsorbent solid, a minor amount of a relatively high molecular weight water-soluble polymer and a minor amount of a superabsorbent, water-swellable polymer. Those sorbent compositions may be used as such to absorb spills of hazardous organic liquids and render them fire-safe or may be compounded with detergents and other cleaning agents to provide compositions which remove embedded greases and oils from floors and other surfaces.

Hence, it is an object of this invention to provide improved sorbent compositions for soaking up flammable liquids and rendering them fire-safe without the inclusion therein of solid fire extinguishing agents.

Another object of this invention is to provide cleaning formulations which include those sorbent compositions as a component thereof.

Yet another object of this invention is to provide novel techniques for manufacturing the sorbent compositions.

Other objects will be apparent from the following description of exemplary embodiments and uses.

MODES FOR CARRYING OUT THE INVENTION

Those compositions set out in applicant's previous patent, U.S. Pat. No. 5,062,996, for soaking up spilled flammable liquids and rendering them fire-safe, required the use of a high molecular weight, hydrocarbon soluble polymer and one or more dry chemical fire extinguishing agents in association with a solid absorbent in order to achieve the desired results. It is now been found that those same, and even better, results may be obtained with compositions which contain neither a hydrocarbon soluble polymer or any appreciable amount of dry chemical fire extinguishing agents. In that regard, the compositions and processes set out in this application may be considered improvements over those of the inventor's previous patent.

In the broadest sense, the sorbent compositions of this invention contain three necessary components; a particulate absorbent solid, a particulate adsorbent solid, and a hydrophilic polymer. It is preferred that the absorbent be organic and combustible although inorganic, non-combustible absorbents such as clays, expanded micas and diatomaceous earth may also be used with the sacrifice of certain desirable properties. Useful organic absorbents include those commonly used for such purposes such as ground corn cobs, oat and other grain brans, rice hulls and other cellulosic materials as, for example, wood pulp, sawdust and the like. Of those absorbents, rice hulls are presently the most preferred on the basis of performance, availability and price. Rice hulls are the powdery, finely divided husk byproduct obtained from the milling of rice.

Adsorbents useful in the compositions of this invention include all of those which can be readily wetted by hydrocarbon liquids and thus serve as wicking agents to facilitate rapid movement of the liquid through a body of the sorbent composition. Such adsorbents include both organic and inorganic, natural and synthetic particulate solids as, for example, activated carbon, silica, chopped fibers of polypropylene, and similar substances. Of those listed adsorbents, activated carbon (not carbon black) is presently the most preferred in view of its performance and price and because it is combustible.

The third necessary component, a hydrophilic polymer, may be either a water soluble polymer or a water swellable polymer. Suitable water soluble polymers include olefin oxide polymers such as poly(ethylene oxide) and copolymers of ethylene oxide with other lower olefin oxides, water soluble vinyl addition polymers such as the various polyacrylamides, polysaccarides and the like. Use of relatively high molecular weight water soluble polymers, above about 1 million, provides additional advantage to the compositions. Preferred water soluble polymers for use in the compositions of this invention comprise those poly(ethylene oxide) polymers of a sufficiently high molecular weight as to impart viscoelasticity to a water solution.

Suitable water swellable polymers include those polymers of the class commonly referred to as superabsorbents. Superabsorbent polymers are further characterized as being capable of at least a ten-fold absorption of aqueous fluids. That classification includes crosslinked acrylics, starch-graft polymers, and crosslinked glycolate and cellulose ethers. Especially preferred water swellable polymers for use in the compositions of this invention include lightly crosslinked, alkali metal polyacrylates. Those polymers owe their absorbency to the carboxylic groups along the spine of the polymer. The carboxylic groups solvate rapidly when contacted with water causing polymer molecules to uncoil and absorb many times their weight of water through hydrogen bonding to form a gel while the crosslinking prevents solution of the polymer in excess water.

All of the sorbent compositions of this invention comprise a major amount, more than 50% by weight, of the absorbent solid and minor amounts, less than 25% by weight, of the adsorbent and of the polymers. Preferred compositions comprise 70-98% by weight of absorbent, 0.5-10% by weight of adsorbent, and 0.1-10% by weight of polymer. Such preferred compositions also employ two polymers, one a water soluble polymer and the other a water swellable polymer with the total polymer content being less than 10% by weight of the total. At present, a most preferred sorbent composition for soaking up spilled flammable liquids includes at least 90% by weight of finely powdered rice hulls as the absorbent, from 1% to about 7% by weight of particulate activated carbon derived from coconut husks, from 0.1% to 2% of a water soluble poly(ethyleneoxide) polymer having a molecular weight in excess of 1 million compounded with an alkali metal bicarbonate and an acid salt so as to rapidly dissolve without agglomeration upon contact with water, and from 1% to 5% by weight of a lightly crosslinked, water swellable, alkali metal polyacrylate.

While the compositions appear to comprise a simple physical admixture of the components, best results are obtained by careful attention to the compounding techniques used. A simple batch mixing of the components ordinarily does not produce a useful homogeneous blend. It has been found to be advantageous to first compound the adsorbent and the polymer (or polymers) to form a homogeneous masterbatch fraction and to thereafter blend that masterbatch with the absorbent. Suitable masterbatch compositions comprise by weight 10% to 90% of a particulate, solid adsorbent such as activated coconut carbon, 5% to 60% of a water swellable polymer such as potassium polyacrylate. and 1% to 10% of a water soluble polymer such as a high molecular weight poly(ethyleneoxide) formulated as described above to dissolve rapidly without agglomeration. Compounding the adsorbent and polymers to form a masterbatch may conveniently be carried out in a mill or muller, such as for example a rod mill, in which some size reduction of the adsorbent and polymer particles may also take place. It has been found useful to conduct the compounding step at temperatures cold enough to cause the polymer to become brittle. Cooling may be accomplished by introducing liquid nitrogen or other suitable refrigerant into the compounding device. Thereafter, the compounded adsorbent-polymer masterbatch is mixed with finely divided particles of the absorbent solid suitably using a double cone or V-type mixer. A light misting with water appears to aid in the blending of the two fractions.

It has further been found to be clearly advantageous, although not absolutely necessary, to add the water soluble polymer to the masterbatch composition and to the sorbent itself as a rapid dissolving formulation prepared in accordance with the procedure set out in applicant's pending U.S. patent application Ser. No. 07/871,070, the disclosure of which is incorporated herein by reference thereto. That application describes a procedure for formulating water soluble polymers so that they dissolve without agglomeration. Formulation is accomplished by coating or otherwise intimately associating polymer particles with finely divided particles of one or more water soluble materials, suitably salts, which react or decompose to produce a gas upon contact with water. The gas produced by reaction or decomposition of the materials serves to disperse and keep separate individual polymer particles until dissolution is well advanced or complete.

Gas producing agents useful in formulating non-agglomerating water soluble polymers include combinations of water soluble basic and acidic compounds which are stable as solids but which react in solution to produce a gas. An exemplary combination of such compounds is represented by ordinary baking powders which are mixtures of sodium bicarbonate with an acid or acid salt such as citric acid, tartaric acid, sodium tartrate, monocalcium phosphate and the like. Other combinations of compounds including salts, for example potassium bicarbonate and monoammonium phosphate, may be used as well. The non-agglomerating polymer formulations may be prepared using conventional mixing and blending equipment. Polymer particles may be coated or otherwise intimately associated with particles of gas producing agents by adding the agents to the polymer particles and tumble mixing as in a conventional double cone or V-blender. It is desirable but not essential that the particle size of the gas producing agents be as small as or smaller than the polymer particles so as to obtain as intimate association as possible between the polymer particles and those of the agent. When using combinations of compounds as the gas producing agent, as for example a bicarbonate and an acid salt, it is usually desirable to coat or associate the polymer particles with the gas producing compounds in a sequential fashion rather than as a mixture. That is to say one of the gas producing compounds is added to the polymer particles and tumble mixed to form particulates comprising one or more polymer particles coated with or otherwise intimately associated with one or more particles of the gas producing compound. Misting of a minute amount of water during the mixing is sometimes advantageous as it promotes adherence of the compound particles to the particles of polymer. Thereafter, the other compound is added to the particulates and is mixed by tumbling or other suitable technique to obtain a particulate polymer formulation comprising polymer particles having a first coat or layer of one gas producing compound and a second coat or layer of another gas producing compound. The particle size of the finished formulation will typically be about that of ordinary table salt.

It is preferred that the basic salt, as for example the bicarbonate, is made the first coating or layer on or associated with the polymer particles. The acid or acid salt is then added to the polymer-basic salt particulates and is mixed to form the exterior coat or layer. Such formulations, particularly those employing poly(ethylene oxide) polymers, display superior dissolving performance as compared to formulations in which the acid moiety is made the first layer with the polymer particles. It is known that poly(ethylene oxide) polymers are quite insoluble in alkali solutions and that effect may account for the difference in result.

The ratio of gas producing agent to polymer is not at all critical so long as the amount of gas produced by the agent is sufficient to prevent agglomeration or clumping of polymer particles during their dissolution. The minimum amount of gas producing agent required to prevent polymer agglomeration upon contact with water depends to some extent upon the agent and may be determined by routine experimentation. When using a combination of a bicarbonate and an acid salt as the gas producing agent, for example, the weight ratio of bicarbonate to polymer may range broadly from about 0.01 to 10 with a more preferred ratio being about 0.05 to 2. It is ordinarily preferred but not required that the amount of acid salt included in the formulation be such that the bicarbonate and acid salt react to a reasonable completeness without leaving a significant excess of either. Stoichiometric balance between the bicarbonate and the acid salt provides the most efficient use of the two compounds for gas production and results in the least change to the pH of the solution. Although the combination of a bicarbonate and an acid salt used to prepare the water soluble polymer as a fast dissolving formulation does have fire extinguishing properties, the concentration of those salts in the sorbent is so small, on the order of 0.5% to 5%, as to alone have no significant fire extinguishing effect. In contrast, the sorbents described in applicant's prior U.S. Pat. No. 5,062,996 typically contained some 25% to 50% by weight of dry chemical fire extinguishing agent.

The resulting sorbent composition may be used as such to soak up and render fire-safe spilled hydrocarbons and other flammable liquids. In dealing with a spilled flammable liquid, unleaded gasoline for example, it has been found effective to first dust a layer of the sorbent composition around the periphery of the spill to essentially form a dam and prevent further spreading. Additional sorbent is then spread in thin layers over the body of the spill until no free liquid remains. Application of the sorbent to the spill may be accomplished by hand, much as one might broadcast seed, or may be applied using a shaker-top container, a scoop or even a shovel. Further, the sorbent composition displays such excellent flow characteristics that it can be applied from a gas pressurized container much as one would apply a dry chemical fire extinguishing agent to a burning surface.

Fire safing is accomplished by applying a water mist to the surface of the flammable liquid-containing, sorbent mass. It is not necessary that free water be present; only that the mass surface be thoroughly wetted. That condition may be readily determined by appearance as the hydrocarbon-saturated sorbent is dark but dull in appearance while the water wetted surface is shiny and darker. The mechanism involved in fire safing the flammable liquid-containing sorbent is believed to be as follows. Water contacting the sorbent causes the water soluble polymer contained in the sorbent to dissolve and to thus form a viscous film or coating across the surface of the sorbent mass. That viscous film is believed to then prevent the escape of flammable vapors from the mass surface and, without the presence of flammable gases, a source of ignition will not produce a flame. It further appears that the strength of the viscous film and its resistance to the passage of gases both increase as the molecular weight of the water soluble polymer increases. For that reason, it is preferred to use those water soluble polymers having a sufficiently high molecular weight, above about 1 million, as to produce a solution displaying a high degree of viscoelasticity when dissolved in water. Polymers with lower molecular weights may also find use but generally will require higher concentrations to be effective than do the higher molecular weight polymers.

The second polymer, the water swellable polymer, also appears to make a significant contribution to the fire safety of the sorbent product. Water swellable polymers such as the alkali metal polyacrylates used in this invention are capable of soaking up and holding as a gel many times their own weight in water. It is believed that the water swellable polymer contributes to the strength and integrity of the gas impervious film formed by the water soluble polymer and prolongs its effectiveness by supplying an effective reservoir of moisture to that film.

Used sorbent, loaded with a flammable liquid, may be safely transported for reclamation or disposal simply by placing it in a sealable container and misting exposed surfaces with water. Fire safety is maintained so long as the container is sealed and the surface polymer film does not dry out. Sorbent saturated in a flammable liquid may be prepared for convenient burning by slurrying it in about an equal volume of a liquid hydrocarbon fuel which may be, for example, a naphtha or light kerosene. The slurried sorbent is slow to settle and can be burned in an industrial boiler equipped with conventional liquid fuel burner nozzles. The small amount of bicarbonate and acidic salts present in the sorbent as a component of the fast dissolving polymer formulation do not appear to significantly affect the burning characteristics of the slurried sorbent. Those properties will, in certain instances, allow the sorbent loaded with a spilled flammable liquid to be treated as a fuel rather than as a hazardous waste material.

Sorbent compositions of this invention will find use in applications other than cleaning up spills of hydrocarbons and other flammable liquids. For example the sorbents may be used as well to clean metal parts to remove the oil residue left after machining simply by tumbling the parts in a drum of the sorbent. They also find use as a component of other products, particularly compositions for cleaning oil and grease residues from floors and the like. In that application, additional cleaning agents, which may be soaps, surfactants, gas generating agents, other polymers and the like, are compounded with the sorbent. Embedded and strongly adhering greases and oils are removed from concrete floors, work areas, machinery and other surfaces by first wetting the surface with water after which the cleaning composition is spread thereon. Water wetting the surface to be cleaned reacts with gas forming components contained in the cleaning composition. Hydrocarbons are solubilized by action of the surfactants contained in the composition and agitated by the generated gas. The hydrocarbons, in turn, are taken up by the sorbent composition leaving a clean surface.

The gas forming components include those contained in the sorbent itself. Additional gas forming components of the cleaning compositions may conveniently comprise a mixture of a bicarbonate and an acid, such as citric, or an acid salt compounded with a water soluble polymer, surfactants and the like. Particularly preferred surfactants include those of the nonionic type which acquire their hydrophilic character from an oxygenated sidechain and which include an amide or an amine as the oil soluble part of the molecule. As a general rule, the sorbent compositions will make up a major portion, typically 60% to 98% by weight, of the cleaning compositions with the balance being the compounded gas forming components. More preferred cleaning compositions contain between about 75% and 95% by weight of sorbent with the balance again being the compounded gas forming components. A small amount of a non-aqueous solvent such as a petroleum naphtha (or a small concentration of a rubbery polymer) may also be incorporated into the cleaning composition before it is mixed with water.

Specific examples of the invention are set out below, it being understood that the examples are illustrative and not limiting.

EXAMPLE 1

A rapid dissolving polymer formulation was prepared from a quantity of POLYOX Grade WSR-303 obtained from Union Carbide Corporation. POLYOX WSR-303 is, according to the manufacturer's literature, a nonionic water-soluble poly(ethylene oxide) polymer having a molecular weight of about 7 million.

A quantity of the WSR-303 polymer was placed in a double-cone laboratory blender along with an equal weight quantity of potassium bicarbonate powder and mixing was continued until a homogeneous particulate blend or overcoating of the bicarbonate on the polymer was obtained. Thereafter, a quantity of monoammonium phosphate in an amount calculated to stoichiometrically react with the bicarbonate was added to the particulate blend of polymer and bicarbonate and mixing was continued until a second homogeneous particulate blend, as determined by visual observation, was obtained. That second homogeneous blend comprised particulates of polymer and bicarbonate overcoated with monoammonium phosphate and constitutes an example of a polymer formulation according to this invention.

A sample of the polymer formulation thus produced was placed in the bottom of a graduated cylinder and the cylinder was then filled with water. Bubbling and movement of the layer of polymer formulation resting at the bottom of the cylinder was observed. The formulation dissolved completely within a few minutes without stirring or agitation. In another test, a beaker was filled nearly to the top with water and was stirred by hand while polymer formulation was dusted onto the surface of the water. The particles of polymer formulation dissolved almost instantly to quickly form a thick, viscous solution. Those two tests were repeated using WSR-303 in the form it was received from the manufacturer. In both instances, the polymer particles agglomerated to form a sticky mass which then was extremely difficult to dissolve.

EXAMPLE 2

A sorbent composition was prepared in the following manner. One part by weight of the polymer formulation of Example 1 together with 4 parts by weight of a lightly crosslinked, potassium polyacrylate absorbent polymer and 6 parts by weight of a particulate activated carbon prepared from coconut husks were placed in a rod mill. The mill was cooled with liquid nitrogen and, after cooling, the mill was operated for about five minutes to mull and mix the various ingredients together to obtain an adsorbent masterbatch.

About 6 parts by weight of the adsorbent masterbatch was added to 97 parts by weight of a finely divided absorbent solid comprising rice hulls. The rice hulls were a byproduct from the milling of rice. The absorbent solids and the adsorbent masterbatch were lightly misted with water and were then tumble mixed for about 5 minutes. Thereafter a quantity of the polymer formulation of Example 1 amounting to about 0.5% by weight of the combined absorbent solids and adsorbent masterbatch was added to the mixture and the mixture was again tumble mixed for about 5 minutes with a light misting of water to obtain a finished sorbent product.

EXAMPLE 3

The ability of the sorbent product of Example 2 to inhibit the escape of vapors from a sorbed hydrocarbon liquid to the atmosphere was compared to that of several other conventional sorbents using the following procedure. Samples comprising an equal weight quantity of the sorbent of Example 2 and of activated carbon, ground corn cobs, rice hulls, and fibrous polypropylene were prepared. Except for the polypropylene, each sorbent was placed in a flat-bottomed pan as a cone-shaped pile formed by allowing the sorbent to find its natural angle of repose. The polypropylene, being fibrous, was simply piled in a mound. Thereafter, kerosene was added dropwise to the apex of the cones and to the top of the mound until liquid seeped from the bottom edges of the sample and all free liquid was drained off. At that point, each sorbent was considered to be at its capacity. An open flame from a small butane torch was then rapidly passed over the surface of each kerosene-loaded sorbent sample. All samples ignited readily and burned vigorously. Similar samples of each sorbent were then prepared and again saturated with kerosene as before. Each of the kerosene-soaked sorbent masses was then lightly misted with water sufficient to thoroughly dampen all exposed surfaces. An open flame from the butane torch was again rapidly passed over the surface of the samples. All of the samples, except for that one made up of the sorbent of Example 2, immediately caught fire and continued to burn. In contrast, the cone containing the sorbent of Example 2 did not flash or catch fire even after repeated passes of the open flame across its surface. Ignition and burning occurred only after the cone surface was directly bathed in the flame for a period of time in excess of about 10 seconds.

EXAMPLE 4

A quantity of the sorbent composition of Example 2 was used to soak up unleaded gasoline to saturation of the sorbent. The resulting sorbent mass was lightly misted with water and was then tested for fire safety by passing an open flame from a gas torch across the surface of the mass. It did not ignite. The water wetted surface of a portion of the sorbent mass was scrapped away and a torch flame was passed across the new surface. It immediately ignited and burned vigorously but the flame was easily snuffed by light misting with water. The gasoline saturated sorbent mass was then added to an equal volume of petroleum naphtha and was stirred. The resulting suspension was slow to settle and could be sprayed through an ordinary liquid fuel nozzle.

EXAMPLE 5

Oil-covered, machined steel parts were placed in a drum with a quantity of the sorbent of Example 2 and were then tumbled for a few minutes. The drum was then opened and the parts removed. The resulting parts were clean, dry and oil-free.

EXAMPLE 6

A cleaning composition was prepared in the following manner. About 6 parts by weight of the adsorbent masterbatch described in Example 2 was added to 97 parts by weight of powdered rice hulls, lightly misted with water, and tumble mixed for about 5 minutes. A portion of the rapid dissolving polymer formulation of Example 1 containing POLYOX Grade WSR-303 was compounded with additional quantities of sodium bicarbonate and monoammonium phosphate to obtain a material having a POLYOX concentration of about 1%. To that material was sequentially added with blending about 10% by weight of a commercial laundry detergent sold under the trademark TIDE and about 1% of a nonionic, amide-type surfactant. That resulting blend was then added to the masterbatch-rice hulls mixture in a weight ratio of 20 parts of the polymer-surfactant blend to 80 parts of the masterbatch-rice hulls mixture. The materials were then tumble blended for about 5 minutes with a light water misting to obtain a finished cleaning composition.

EXAMPLE 7

An area of garage floor having a heavy buildup of tightly adhering greases and oils was wet with water. The wetted floor was then dusted over with the cleaning composition of Example 6 to a depth of about one-eighth inch. Considerable bubbling and agitation of the powdered cleaning composition was observed as the water caused the mixed bicarbonate and acid salts to react with the generation of carbon dioxide. The cleaning composition was allowed to remain on the floor for a short time, about 10 minutes, and was then swept up and removed from the floor. It was observed that the oils and greases had been taken up by the sorbents contained in the cleaning composition leaving the garage floor free of hydrocarbons and nearly white in appearance.

Other variations on the exemplary formulations set out in the disclosure and other uses of those formulations will be evident to those skilled in the art. Such variations and uses are considered to fall within the spirit and scope of the invention described and claimed herein.

I claim:

1. A sorbent composition useful for soaking up and containing flammable liquids, said sorbent comprising a particulate solid absorbent in admixture with an effective amount of a particulate solid adsorbent, an effective amount of a first polymer and an effective amount of a second polymer, said absorbent making up more than 50% by weight of the composition, said adsorbent making up more than 0.5% but less than 25% by weight of the composition, said first polymer and said second polymer together making up less than 25% by weight of the composition, each of said polymers making up at least 0.1% by weight of said composition, said first polymer being a particulate, water soluble polymer having a molecular weight in excess of 1 million, and said second polymer being a water swellable polymer capable of at least a ten-fold absorption of an aqueous fluid, wherein said water swellable polymer cooperates with the said water soluble polymer to form a gas impervious film on sorbent surface when said surface is wetted with water.

2. The composition of claim 1 wherein said absorbent is present in an amount ranging from 70% to 98% by weight of the total, wherein said absorbent is present in an amount ranging from 0.5% to 10% by weight of the total, and wherein said polymers are present in an amount ranging from 0.1% to 10% by weight of the total.

3. The composition of claim 1 wherein said absorbent is a combustible organic solid.

4. The composition of claim 3 wherein said absorbent is powdered rice hulls.

5. The composition of claim 3 wherein said absorbent is ground corn cobs.

6. The composition of claim 3 wherein said absorbent is finely divided peat moss.

7. The composition of claim 1 wherein said absorbent is activated carbon.

8. The composition of claim 7 wherein said activated carbon is derived from coconut husks.

9. The composition of claim 1 wherein said adsorbent is a polymer.

10. The composition of claim 8 wherein said polymer is polypropylene.

11. The composition of claim 1 wherein the particles of said water soluble polymer are arranged in intimate association with particles of an alkali metal bicarbonate and an acidic compound, said bicarbonate and acidic compound reacting to release carbon dioxide when wetted with water.

12. The composition of claim 11 wherein said water soluble polymer is a poly(olefinoxide).

13. The composition of claim 11 wherein said water soluble polymer is a polyacrylamide.

14. The composition of claim 1 wherein said polymer is water swellable, is capable of at least a ten-fold absorption of aqueous fluids, and is selected from the group consisting of crosslinked acrylics, starch-graft polymers and crosslinked glycolate and cellulose ethers.

15. The composition of claim 14 wherein said water swellable polymer is a lightly crosslinked, alkali metal polyacrylate.

16. A sorbent composition comprising at least 90% by weight of finely powdered rice hulls, from 1% to about 7% by weight of particulate activated carbon derived from coconut husks, from 0.1% to 2% by weight of a water soluble poly(ethyleneoxide) polymer having a molecular weight in excess of 1 million compounded with an alkali metal bicarbonate and an acid or acid salt so as to rapidly dissolve without agglomeration upon contact with water, and from 1% to 5% by weight of a lightly crosslinked, water swellable alkali metal polyacrylate.

17. A cleaning composition comprising the sorbent composition of claim 16 to which is added gas forming components; said components comprising a mixture of an alkali metal bicarbonate and an acidic material compounded with a water soluble polymer and surfactants said water soluble polymer being a high molecular weight poly(ethyleneoxide) or polyacrylamide, said surfactants including at least one nonionic surfactant having an amine or an amide as the oil soluble moiety, said gas forming components making up from about 5% to 25% by weight of the total cleaning composition weight.

18. A masterbatch useful for preparing sorbents and cleaning compositions comprising 10% to 90% by weight of a particulate activated carbon, 1% to 10% by weight of a water soluble, high molecular weight poly(ethyleneoxide) compounded with an alkali metal bicarbonate and an acidic compound so as to rapidly dissolve without agglomeration upon contact with water, and 5% to 60% by weight of a water swellable, alkali metal polyacrylate polymer.

19. A method for preparing a sorbent composition useful for soaking up and containing flammable liquids comprising:

combining a solid combustible adsorbent, a water swellable polymer, and a water soluble polymer in a mill, said mill being adapted to comminute and to mix solids placed therein;

cooling said mill to a temperature whereat said polymers become brittle and operating said mill for a period of time sufficient to obtain a masterbatch, said masterbatch being a blend of the materials placed in said mill;

combining a minor quantity of said masterbatch with a major quantity of a finely divided organic absorbent;

mixing said masterbatch and said absorbent to obtain a blend;

adding to that blend a minor amount of a water soluble polymer; and mixing said blend and polymer to obtain a sorbent product.

20. The method of claim 19 wherein said masterbatch contains 10% to 90% by weight of adsorbent, 5% to 60% by weight of water swellable polymer, and 1% to 10% by weight of water soluble polymer.

21. The method of claim 19 including the step of adding water in the form of a mist to the combined masterbatch and organic absorbent as it is mixed.

22. The method of claim 19 wherein said water soluble polymer contained in said masterbatch and added to the mixed masterbatch and absorbent is in the form of a rapid dissolving formulation comprising particles of said polymer arranged in intimate association with particles of an alkali metal bicarbonate and an acidic compound.

23. The method of claim 22 wherein said absorbent is rice hulls, said adsorbent is activated carbon, said water swellable polymer is an alkali metal polyacrylate and wherein said water soluble polymer is poly(ethyleneoxide).

* * * * *